United States Patent [19]
Holdampf

[11] Patent Number: 5,498,062
[45] Date of Patent: Mar. 12, 1996

[54] CHILD RESTRAINT SEAT

[75] Inventor: Carl J. Holdampf, Farmington Hills, Mich.

[73] Assignee: Douglas & Lomason Company, Farmington Hills, Mich.

[21] Appl. No.: 138,738

[22] Filed: Oct. 18, 1993

[51] Int. Cl.$^6$ ..................................................... A47C 15/00
[52] U.S. Cl. ............................. 297/238; 297/14; 297/324
[58] Field of Search ................................. 297/238, 237, 297/234, 256, 14, 112, 114, 317, 318, 324, 334, 256.1, 256.12

[56] References Cited

U.S. PATENT DOCUMENTS

| | | |
|---|---|---|
| 1,965,048 | 6/1934 | Morris . |
| 2,337,480 | 12/1943 | Logan . |
| 2,436,294 | 2/1948 | Glatstein . |
| 2,584,481 | 2/1952 | Mast et al. . |
| 2,966,201 | 12/1960 | Strahler . |
| 3,094,354 | 6/1963 | Bernier . |
| 3,594,037 | 7/1971 | Sherman .................................. 297/14 |
| 4,230,366 | 10/1980 | Ruda . |
| 4,533,176 | 8/1985 | Wyttenbach . |
| 4,540,216 | 9/1985 | Hassel, Sr. . |
| 4,541,654 | 9/1985 | Jonasson . |
| 4,555,135 | 11/1985 | Freeland . |
| 4,596,420 | 6/1986 | Vaidya . |
| 4,655,503 | 4/1987 | Kamijo et al. . |
| 4,664,443 | 5/1987 | Casale . |

(List continued on next page.)

FOREIGN PATENT DOCUMENTS

| | | |
|---|---|---|
| A66992/90 | 12/1989 | Australia . |
| 0258194 | 8/1986 | European Pat. Off. . |
| 0286542 | 4/1987 | European Pat. Off. . |
| 0324503 | 1/1988 | European Pat. Off. . |
| 0348374 | 6/1988 | European Pat. Off. . |
| 2307673 | 4/1975 | France . |
| 2624805 | 12/1987 | France . |
| 2665399 | 8/1990 | France . |
| 2454573 | 5/1975 | Germany . |
| 7612141 | 4/1976 | Germany . |
| 2720954 | 12/1977 | Germany . |
| 7916857 | 6/1979 | Germany . |
| 2807064 | 8/1979 | Germany . |
| 2825329 | 12/1979 | Germany . |
| 2823529 | 12/1979 | Germany . |
| 3020212 | 12/1981 | Germany . |
| 3215488 | 11/1983 | Germany . |
| 3716038 | 12/1987 | Germany . |
| 3631726 | 3/1988 | Germany . |
| 59-156836 | 9/1984 | Japan . |
| 2023415 | 6/1978 | United Kingdom . |
| 2122886 | 1/1984 | United Kingdom . |
| 2167949 | 12/1984 | United Kingdom . |
| 2209666 | 5/1989 | United Kingdom . |

OTHER PUBLICATIONS

The Integrated Child Seat: Elements Of Design (920494), J. Lambert, Atoma International, Inc. pp. 1 through 12.
Accessories Bulletin–Volvo Parts Division–Apr. 1991–940 Sedan Child Safety Cushion–No. 2.
Accessories Bulletin–Volvo Parts Division–Sep. 1990–Child Cushion & Backrest–No. 1.
Electrolux Autoliv–Expanding Integrated Child Booster Cushion–P. 1 through 4.

*Primary Examiner*—Laurie K. Cranmer
*Attorney, Agent, or Firm*—Harness, Dickey & Pierce

[57] ABSTRACT

A "fold-out" or integral child restraint seat having a mechanism interconnecting a headrest member and a seat member for causing coordinated movement therebetween. When deployed the headrest member is automatically rotated to a raised position in coordination with movement of the seat member to its lowered position. Conversely, when stowed the headrest member is automatically rotated to a lowered position in coordination with movement of the seat member to its raised position. The integral child seat also provides an improved latching mechanism that is operable for positively retaining the integral child seat in both its stowed and deployed positions.

29 Claims, 3 Drawing Sheets

U.S. PATENT DOCUMENTS

| | | |
|---|---|---|
| 4,690,449 | 9/1987 | Holman . |
| 4,690,455 | 9/1987 | Bailey et al. . |
| 4,722,568 | 2/1988 | Irvin . |
| 4,756,573 | 7/1988 | Simin et al. . |
| 4,768,827 | 9/1988 | Musgrove . |
| 4,900,086 | 2/1990 | Steward . |
| 4,900,087 | 2/1990 | Crisp . |
| 4,902,070 | 2/1990 | Casale et al. . |
| 4,913,498 | 4/1990 | Forlivio . |
| 4,936,627 | 6/1990 | Guim . |
| 4,936,631 | 6/1990 | Mochida et al. . |
| 4,943,112 | 7/1990 | Law . |
| 4,986,600 | 1/1991 | Leblanc et al. . |
| 5,026,118 | 6/1991 | Vander Stel et al. . |
| 5,100,199 | 3/1992 | Vander Stel et al. . |
| 5,106,158 | 4/1992 | Dukatz et al. . |
| 5,135,285 | 8/1992 | Dukatz et al. . |
| 5,161,855 | 11/1992 | Harmon . |
| 5,282,667 | 2/1994 | Elton et al. ............... 297/238 |
| 5,312,156 | 5/1994 | Heussner et al. ........ 297/238 |
| 5,366,270 | 11/1994 | Heussner et al. ........ 297/238 |
| 5,380,060 | 1/1995 | Sponder et al. ......... 297/238 |
| 5,385,384 | 1/1995 | Gierman et al. ......... 297/238 |

CHILD RESTRAINT SEAT

BACKGROUND OF THE INVENTION

The present invention relates generally to child restraint seats and, more particularly, to a child restraint seat of the type integrated into the backrest of a vehicular seating arrangement and having means for causing coordinated movement of a headrest member and a seat member between stowed and deployed positions.

Virtually all motor vehicles are equipped with safety belt restraint systems for physically restraining the seat occupant when the vehicle is subjected to a high rate of deceleration which may occur, for example, during a motor vehicle collision. While conventional safety belt restraint systems are well-suited for restraining adult passengers, it is a common practice to use an auxiliary child restraint seat having a belt-type harness for children under a given age and weight. As is known, such auxiliary child seats are placed on top of the vehicle seat and secured thereto using the existing vehicular safety belt restraint system.

In an effort to minimize the inconvenience associated with installing and/or stowing auxiliary child seats, some motor vehicles are now available with seating arrangements that have a "fold-out" child restraint seat integrated into the backrest of an otherwise conventional seat. When needed, the integral child seat can be deployed by rotating a seat member to a lowered operative position and rotating a headrest member to a raised operative position thereby exposing a belt-type harness that is provided for restraining a child seated within the child seat. Following use, the integral child seat can be stowed by lowering the headrest member and raising the seat member to storage positions concealed within the backrest. Once stowed, the seating arrangement accommodates an adult in a normal seated position while preserving the overall cosmetic appearance and comfort of the vehicle seat. In addition, integral child restraint seats are typically equipped with a latching mechanism for releasably locking the headrest member in its raised and lowered positions.

Since integral child restraint seats are intended for use with small children, it is not uncommon for a person to be burdened with the job of releasing and deploying the child seat from its stowed position while holding the child in one arm. Thus, prior to placing the child in the child seat, the person must initially pull-down on the seat member for rotating the seat member to its lowered operative position. Thereafter, the latching mechanism must be deliberately actuated for unlocking the headrest member to permit subsequent rotation of the headrest member to its raised operative position. Unfortunately, this multi-step process for deploying a conventional integral child seat typically requires the use of both hands which is generally considered to be awkward and cumbersome. Furthermore, a similar process is required for subsequently returning the integral child seat to its stowed position. Thus, the need exists to provide an integral child seat with means for minimizing the amount of manual manipulation required for deploying and stowing the child seat.

SUMMARY OF THE INVENTION

Accordingly, the present invention is directed to meeting the above object by providing a "fold-out" or integral child restraint seat having means interconnecting the headrest member and the seat member for causing coordinated movement therebetween. Thus, when it is desired to deploy the integral child seat, the headrest member is automatically moved to its raised operative position in coordination with movement of the seat member to its lowered operative position. Conversely, when it is desired to stow the integral child seat within the backrest, the headrest member is automatically moved to its lowered storage position in coordination with movement of the seat member to its raised storage position. As a result, movement of the integral child seat between its stowed and deployed positions can be accomplished in one operation for substantially enhancing the convenience afforded to the person attempting such movement.

A further object of the present invention is to provide an improved latching mechanism that is operable for positively retaining the integral child seat in either of its stowed and deployed positions. As a related object, the latching mechanism is operable for locking the seat member in either of its raised storage or lowered operative positions which, in conjunction with the movement coordinating means, causes the headrest member to be positively retained in the respective one of its lowered storage or raised operative positions.

Additional objects, advantages, and features of the present invention will become apparent to those skilled in the art from studying the following written description and appended claims, taken in conjunction with the accompanying drawings.

DETAILED DESCRIPTION OF THE INVENTION

The present invention is generally directed to an improved construction for a child restraint seat which can be integrated into a vehicular seating arrangement. More particularly, various embodiments of an integral child restraint seat are disclosed which offer improved convenience and operational advantages over conventional integral child seats. Thus, it is to be understood that while the various embodiments of the present invention are hereinafter disclosed in association with a particular seating arrangement, the seating arrangement is merely an exemplary representation of one type of environment to which the present invention is readily applicable.

Figure 1:
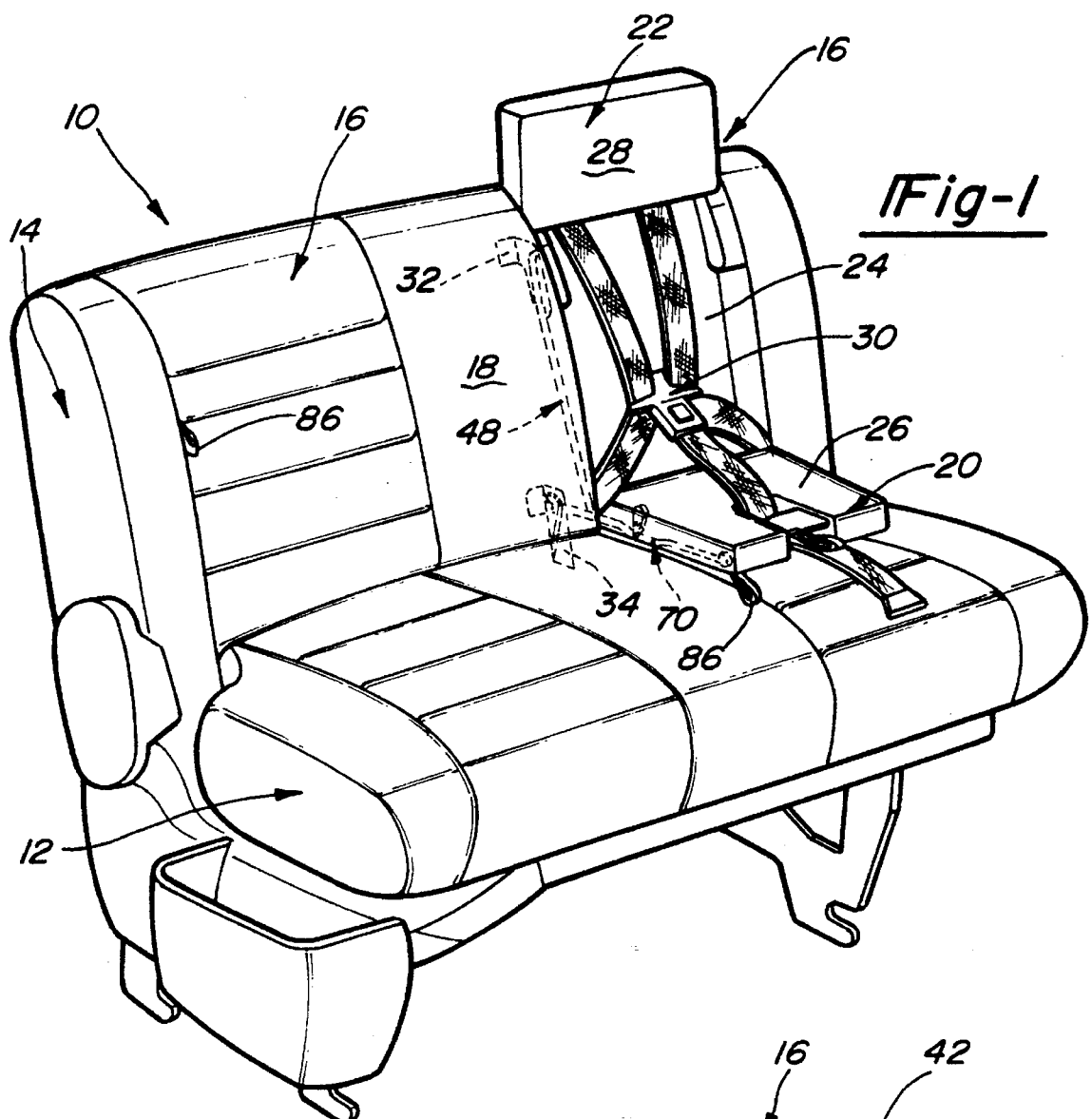
FIG. 1 is a perspective view of an exemplary vehicular seat having a pair of integral child restraint seats embodying the novel principles of the present invention, and which shows the passenger-side integral child seat in a "stowed" position and the driver-side integral child seat in a "deployed" position.

Referring now to the drawings, and particularly to FIG. 1, an exemplary bench seat 10 of the type used in motor vehicles is shown. Bench seat 10 includes a seat cushion 12, a backrest 14, and a pair of integral child restraint seats 16 incorporated into backrest 14 on opposite sides of a central cushioned portion 18. Each integral child seat 16 includes a seat member 20 and a headrest member 22. As shown, the passenger-side of bench seat 10 is in a normal adult seating position with its integral child seat 16 retracted into a "stowed" position. In this position, integral child seat 16 is completely concealed within backrest 14 such that bench seat 10 has the cosmetic appearance and function of an otherwise conventional bench seat which can be used in the usual manner with a seat occupant restrained by a conventional vehicular safety belt restraint system (not shown). As is also shown, the integral child seat 16 associated with the driver-side of bench seat 10 is extended to a "deployed" position. Once deployed, a cushioned back pad 24, a cushioned seat pad 26, a cushioned headrest pad 28 and a safety belt restraint system, shown as a belt-type harness restraint 30, are exposed. As will be detailed hereinafter, integral child seats 16 include means interconnecting seat member 20 and headrest member 22 for causing concurrent and proportional movement therebetween. Thus, movement of integral child seats 16 between the "stowed" and "deployed" positions can be accomplished with one continuous motion.

Figure 2:
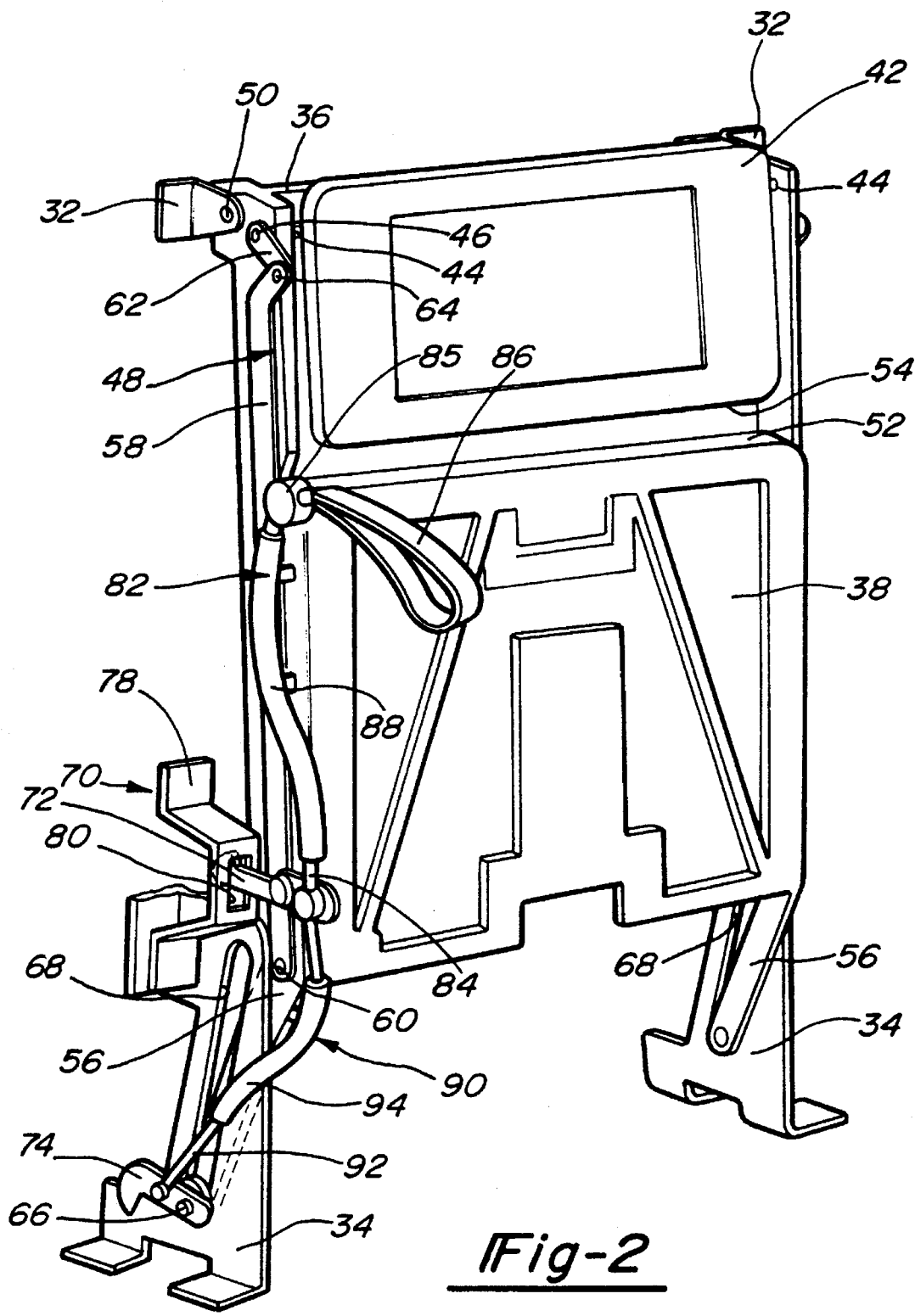
FIG. 2 is a perspective view of the underlying structural components for the integral child seats illustrating these components retracted into the "stowed" position.
Figure 3:
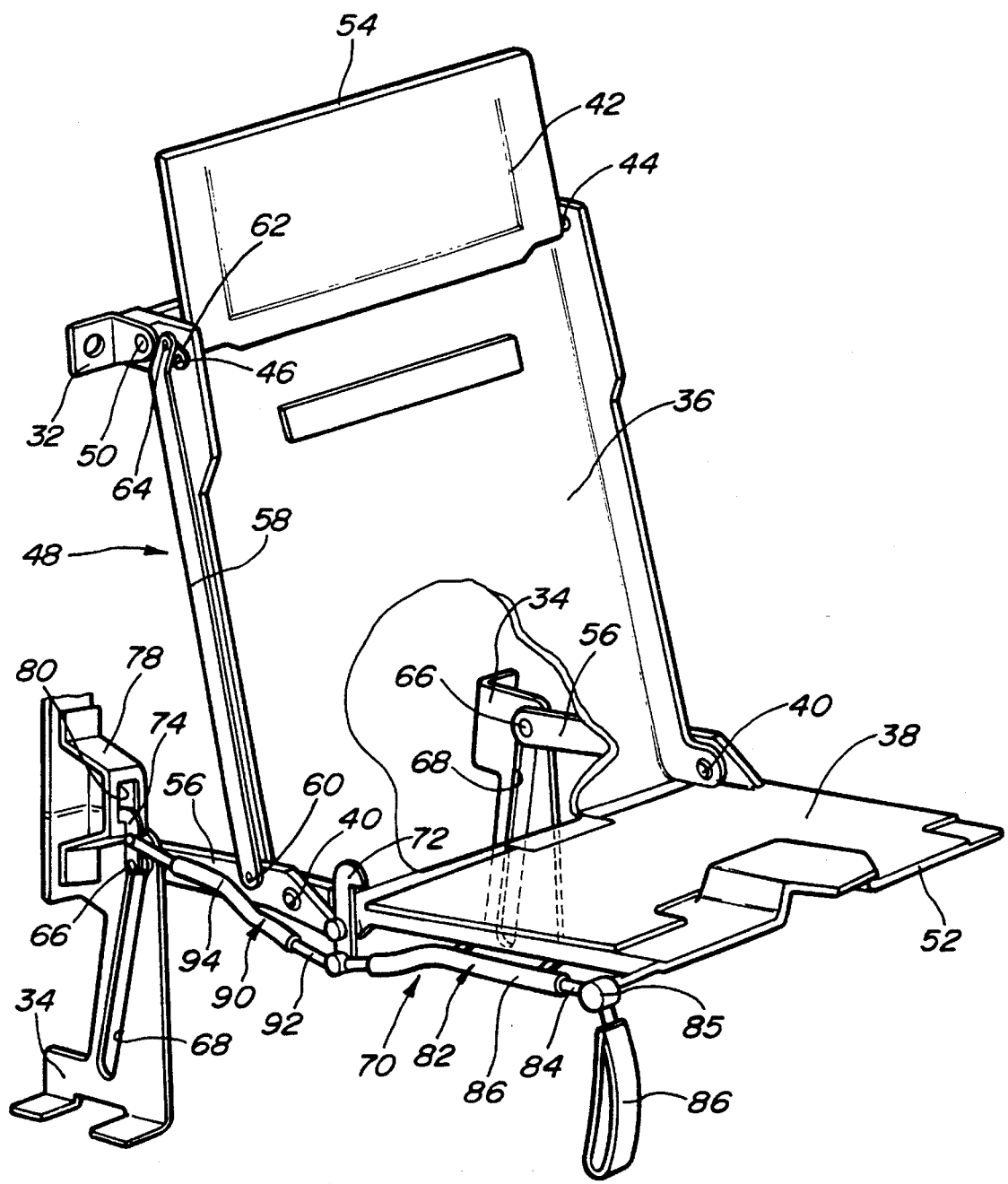
FIG. 3 is a perspective view of the underlying structural components for the integral child seats illustrating these components extended to the "deployed" position.

With particular reference now to FIGS. 2 and 3, one of the integral child seats 16 is shown with its upholstery and padding removed to more clearly illustrate the novel structural and operational features of the present invention. In general, integral child seat 16 is a modular assembly having upper and lower mounting brackets 32 and 34, respectively, that are providing for securing integral child seat 16 to a rigid frame structure (not shown) of bench seat 10. More specifically, the basic underlying structure of integral child seat 16 includes a back support 36, a seat pan 38 coupled to a lower portion of back support 36 for pivotable movement about seat pivots 40 and a head support 42 having an elongated shaft 44 supported from an upper portion of back support 36 for pivoting head support 42 about headrest pivots 46. In addition, integral child seat 16 includes movement coordinating means 48 interconnecting seat pan 38 to head support 42 for coordinating the concurrent and proportional movement of seat member 20 and headrest member 22 between positions establishing the "stowed" and "deployed" positions. As an additional feature, means are also provided for causing pivotable reclining movement of back support 36 about seatback pivots 50 between a rearward upright position when integral child seat 16 is in its "stowed" position and a forward reclined position when integral child seat 16 is in its "deployed" position. Thus, such reclining movement allows integral child seat 16 to be articulated from its "stowed" position deep within a recessed cavity of backrest 14 to its "deployed" position providing greater seated comfort to the child.

In operation, when it is desired to return integral child seat 16 to its "stowed" position concealed within backrest 14, pivotal movement of seat pan 38 about seat pivots 40 toward a raised storage position causes movement coordinating means 48 to automatically pivot head support 42 about headrest pivots 46 toward a lowered storage position while back support 36 is pivoted about seatback pivots 50 toward its rearward upright position. As will be appreciated, movement coordination means 48 is also adapted to automatically pivot seat pan 38 toward its raised storage position in response to pivotable movement of head support 42 toward its lowered storage position. As seen from FIG. 2, when child seat 16 is stowed, seat pan 38 and head support 42 are generally parallel to upright back support 36 and their respective proximal edge portions 52 and 54 are oriented in a generally facing relationship.

When it is desired to move integral child seat 16 into the fully "deployed" position, pivotal movement of seat pan 38 about seat pivots 40 to a lowered operative position causes movement coordinating means 48 to automatically pivot head support 42 about headrest pivots 46 to an elevated operative position while back support 36 is pivoted about seatback pivots 50 to its forward reclined position. As seen from FIG. 3, when child seat 16 is opened into its fully "deployed" position, seat pan 38 is generally perpendicular to reclined back support 36 and head support 42 is generally parallel thereto. Thus, movement coordinating means 48 is adapted to cause about 180° of rotation of head support 42 concurrent with about 90° of rotation of seat pan 38 with respect to back support 36. Accordingly, movement coordinating means 48 is operable to permit a person to accomplish movement of integral child seat 16 between its "stowed" and "deployed" positions with one motion (i.e., a single-handed operation).

With continued reference to FIGS. 2 and 3, seat pan 38 is shown to include a pair of laterally-spaced and rearwardly extending legs 56. As seen, seat pivots 40 are preferably defined by pivot pins which pivotably interconnect the lower lateral portions of back support 36 to forward portions of legs 56. Pursuant to a preferred embodiment, movement coordinating means 48 includes a pair of elongated cranks or drive links 58 (one shown) each having its lower end pivotably coupled at a lower pivot 60 to an intermediate portion of its respective one of legs 56 on seat pan 38. In addition, movement coordinating means 48 also includes a pair of short pivot links 62 each having a first end pivotably coupled at an upper pivot 64 to the curved upper end of its respective one of drive links 58. The opposite end of each pivot link 62 is fixed to an end of elongated shaft 44. As noted, shaft 44 extends through opposite upper lateral portions of back support 36 for establishing headrest pivots 46. As such, pivotable movement of pivot links 62 results in simultaneous rotation of shaft 44 which, in turn, causes concurrent pivotal movement of head support 42 about headrest pivots 46. Thus, in one preferred form, movement coordinating means 48 is disclosed as a pair of laterally-spaced linkage assemblies that are synchronously operable to cause movement of one of head support 42 or seat pan 38 in response to movement of the other thereof.

To provide means for causing back support 36 to pivot about seatback pivots 50 between its upright and reclined positions in response to movement of integral child seat 16 between its "stowed" and "deployed" positions, respectively, a follower pin 66 is fixed to the distal end of each leg 56 and extends outwardly through elongated guide slots 68 formed in lower mounting brackets 34. Guide slots 68 are shown to be angulated upwardly and forwardly. Thus, as seat pan 38 is caused to pivot about seat pivots 40, the follower pins 66 at the distal ends of legs 56 slide within angulated guide slots 68 for causing pivotable movement of back support 36 about seatback pivots 50.

Integral child seat 16 is further equipped with a latching mechanism 70 for releasably latching child seat 16 in both of its "stowed" and "deployed" positions. In general, latching mechanism 70 is arranged to normally operate in a "locked" mode for inhibiting movement of either seat pan 38 or head support 42 which, in conjunction with movement coordinating means 48, further inhibits movement of the other component. More particularly, latching mechanism 70 is a manually-operable actuation assembly that can be selectively actuated for placing latching mechanism 70 in a "released" mode, whereby the above-noted coordinated and proportional movement of seat pan 38, head support 42 and back support 36 is subsequently permitted. According to the construction shown, latching mechanism 70 includes a first spring-biased latch pawl 72 that is pivotably coupled to one lateral edge of seat pan 38, a second spring-biased latch pawl 74 that is pivotably coupled to follower pin 66, and a latch plate 78 fixed to lower mounting bracket 34 and having a locking aperture 80 formed therein. While not shown, latching mechanism 70 includes a suitable spring-biasing arrangement for normally urging first latch pawl 72 and second latch pawl 74 toward a locked position. Latching mechanism 70 is also shown to include a first cable assembly 82 having an axially movable inner core 84 having a first end extending through a pulley 85 and coupled to a manually-operable release strap 86 and a second end coupled to first latch pawl 72. First cable assembly 82 also includes an outer sheath 88 supported from the lateral edge of seat pan 38. A second cable assembly 90 is coupled in series with first cable assembly 82 and includes a second inner core 92 interconnecting first latch pawl 72 to second latch pawl 74, and a second outer sheath 94 supported from leg 52 of seat pan 34.

As best seen from FIG. 2, first latch pawl 72 is lockingly retained within locking aperture 80 of latch plate 78 for locking integral child seat 16 in its "stowed" position. In addition, the spring-biasing arrangement is adapted to normally maintain first latch pawl 72 in locked engagement with latch plate 78. Thus, when it is desired to deploy child seat 16, release strap 86 is pulled for axially displacing first inner core 84 in opposition to the biasing exerted on first latch pawl 72, whereby first latch pawl 72 is forcibly pivoted to a released position disengaged from locking aperture 80 of latch plate 78. Following such release of first latch pawl 72 from locking aperture 80, integral child seat 16 can thereafter be moved from its "stowed" position to its "deployed" position by continuing to pull on release strap 86 for causing seat pan 38 to rotate forwardly about seat pivots 40 from its raised storage position to its lowered operative position. As noted, such forward pivotal movement of seat pan 38 causes legs 56 of seat pan 38 to be driven upwardly due to follower pins 66 being guided within guide slots 68. Such upward movement of legs 56 cause drive links 58 to also move upwardly which, in turn, causes pivot links 62 to pivot about headrest pivots 46 for proportionally rotating head support 42 from its lowered storage position to its elevated operative position. Concurrently, back support 36 pivots about seatback pivots 50 to its reclined position. Alternatively, the concurrent articulated movement of seat pan 38, head support 42 and back support 36 can also be established, following release of first latch pawl 72 from latch plate 78, by pulling upward on headrest member 22 instead of pulling down on seat member 20.

From FIG. 3 it can be seen that once integral child seat 16 is in the fully "deployed" position, second latch pawl 74 is lockingly retained in locking aperture 80 of latch plate 78 for inhibiting movement of seat member 20 and headrest member 22 toward their storage positions. Again, the spring-biasing arrangement is adapted to normally maintain second latch pawl 74 in locked engagement with latch plate 78. When it is desired to return integral child seat 16 to its "stowed" position, release strap 86 is again pulled in opposition to the biasing arrangement for releasing second latch pawl 74 from locking aperture 80, whereby downward movement of headrest member 22 or upward movement of seat member 20 causes concurrent articulated movement of the components toward their respective storage positions. Following release of the release strap 86, the spring-biasing arrangement will automatically retract release strap 86 to return latching mechanism 70 to its "locked" mode until release strap 86 is again deliberately pulled for intentionally placing latching mechanism 70 in its "released" mode.

Figure 4:
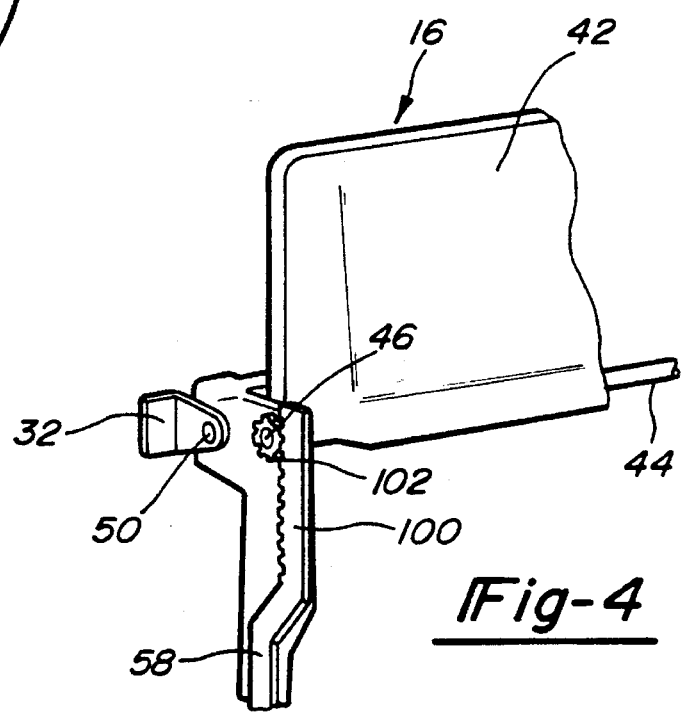
FIG. 4 is a perspective view of a modified upper portion of an integral child seat illustrating an alternative embodiment of the present invention.

With particular reference now to FIG. 4, an alternative embodiment of the present invention is shown. In brief, the upper end of drive links 58 has been modified to include a toothed rack segment 100, and short pivot links 62 have been replaced by toothed pinions 102 that are fixedly attached to opposite ends of shaft 44. Thus, when seat member 20 is pivoted about seat pivots 40, movement of drive links 58 causes rack segments 100 to rotate pinions 102 for concurrently rotating head support 42 about headrest pivots 46. As a result, when seat member 20 is lowered into its operative position, headrest member 22 is simultaneously articulated into its elevated operative position. This alternative construction may be further modified to include a geared arrangement for generating translatory movement of headrest member 22 instead of the previously-described rotary movement in response to movement of rack segments 100 with drive links 58.

Note that when either embodiment of child seat 16 is moved to its fully "deployed" position, pivot links 62 or pinions 102 have rotated nearly 180°. However, the amount of such rotation can be controlled by changing the location of the lower end of drive links 58 with respect to legs 56 of seat pan 38. For example, if it was desired to rotate pivot links 62 or pinion 102 less than 180°, the lower end of drive links 58 could be pivotably coupled to legs 56 at a position closer to seat pivots 40, thereby causing drive links 58 to have less upward travel which results in less rotation of pivot links 62 or pinions 102.

Accordingly, one primary feature of the present invention is the ability to deploy child seat 16 with one hand by a simple one motion process. In the "stowed" position, release strap 86 on seat member 20 is grasped by the operator and pulled. Following release of first latch pawl 72 from latch plate 78, and without changing his/her grasp, the operator simply continues to pull on release strap 86 for pivoting seat member 20 into its lowered operative position where second latch pawl 74 automatically latches. As seat member 20 is pivoted into its operative position, headrest member 22 is automatically articulated into its operative position by movement coordinating means 48. Accordingly, the operator is able to quickly and easily move child restraint seat 16 between its "stowed" position and its fully "deployed" position with relative ease from even the most awkward locations.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A child seat integrated into a backrest of a vehicle seat and adapted to be moved from a stowed position within the backrest to a deployed position by rotationally elevating a headrest member and lowering a seat member, the improvement comprising interconnection means for automatic rotational elevation of said headrest member in coordination with lowering of said seat member.

2. The child seat of claim 1 wherein said interconnection means comprises a linkage interconnecting said seat member to said headrest member.

3. The child seat of claim 2 wherein said linkage includes a first link pivotably coupled between said seat member and a second link, said second link being coupled to said headrest member such that lowering of said seat member causes said first link to forcibly pivot said second link for elevating said headrest member.

4. The child seat of claim 2 wherein said linkage includes a link having a first end pivotably coupled to said seat member and a second end having a toothed segment formed thereon, and a toothed pinion fixed to said headrest member and meshingly engaged with said toothed segment, whereby lowering of said seat member causes said link to rotate said toothed pinion for elevating said headrest member.

5. The child seat of claim 1 further comprising latching means for releasably latching said seat member in a lowered operative position when said child seat is in said deployed position and releasably latching said seat member in a raised storage position when said child seat is in said stowed position, said interconnecting means being coactive with said latching means for inhibiting movement of said headrest member from an elevated operative position when said seat member is latched in said lowered operative position and for inhibiting movement of said headrest member from a lowered storage position when said seat member is latched in said raised storage position.

6. The child seat of claim 5 wherein said latching means includes a latching mechanism that is normally operable in a locked mode for latching said seat member in said lowered operative and raised storage positions, and a manually-operable release mechanism coupled to said latching mechanism for selectively placing said latching mechanism in a released mode to permit movement of said seat member between said lowered operative and raised storage positions for concurrently causing movement of said headrest member between said elevated operative and lowered storage positions, respectively, in response thereto.

7. The child seat of claim 1 further comprising a back support member having said seat member supported from a lower portion thereof for movement between a lowered operative position and a raised storage position, said headrest member being supported from an upper portion of said back support for movement between an elevated operative position and a lowered storage position, and said interconnection means couples said seat member to said headrest member for automatic rotational movement of said headrest member between said lowered storage position and said elevated operative position in coordination with movement of said seat member between said raised storage position and said lowered operative position in response to movement of said child seat between said stowed position and said deployed position.

8. The child seat of claim 7 wherein said interconnecting means is a linkage having a first link pivotally coupled between said seat member and a second link, said second link being fixed for movement with said headrest member such that movement of said seat member causes said first link to forcibly pivot said second link for causing concurrent and proportional movement of said headrest member.

9. The child seat of claim 7 wherein said interconnecting means comprises a link having a first end pivotally coupled to said seat member and a second end having a toothed segment formed thereon, and a toothed pinion fixed to said headrest member and meshingly engaged with said toothed segment, whereby movement of said seat member causes said link to rotate said toothed pinion for concurrently and proportionally moving said headrest member.

10. The child seat of claim 7 further comprising latching means for releasably latching said seat member in said lowered operative position when said child seat is in said deployed position and releasably latching said seat member in said raised storage position when said child seat is in said stowed position, said interconnecting means being coactive with said latching means for inhibiting movement of said headrest member from said elevated operative position when said seat member is latched in said lowered operative position and for inhibiting movement of said headrest member from said lowered storage position when said seat member is latched in said raised storage position.

11. The child seat of claim 10 wherein said latching means includes a latching mechanism that is normally operable in a locked mode for latching said seat member in one of said lowered operative and raised storage positions, and a manually-operable release mechanism coupled to said latching mechanism for selectively placing said latching mechanism in a released mode to permit movement of said seat member between said lowered operative and raised storage positions for concurrently moving said headrest member between said elevated operative and lowered storage positions, respectively, in response thereto.

12. The child seat of claim 7 wherein said interconnecting means is further operable for moving said back support between a rearward upright position and a forwardly reclined position in response to movement of said seat member between said raised storage position and said lowered operative position.

13. A retractable child seat that is movable between a stowed position and a deployed position, comprising:

a back support member;

a head support member pivotally interconnected to said back support member for rotational movement between a lowered storage position and an elevated exposed position;

a seat member interconnected to said back support member for movement between a raised storage position and a lowered exposed position; and movement coordinating means interconnecting said head support member to said seat member for automatic rotational elevation of said head support member to said elevated exposed position in coordination with movement of said seat member to said lowered exposed position for establishing said deployed child seat position, and for automatically rotating said head support member to said lowered storage position in coordination with movement of said seat member to said raised storage position for establishing said stowed child seat position.

14. The child seat of claim 13 further comprising a latching mechanism for releasably latching said seat member and said head support member in their respective storage and exposed positions.

15. The child seat of claim 14 wherein said latching mechanism is operable for releasably latching said seat member in said lowered exposed position when said child seat is in said deployed position and releasably latching said seat member in said raised storage position when said child seat is in said stowed position, said interconnecting means being coactive with said latching mechanism for inhibiting movement of said head support member from said elevated exposed position when said seat member is latched in said lowered exposed position and for inhibiting movement of said head support member from said lowered storage position when said seat member is latched in said raised storage position.

16. The child seat of claim 15 wherein said latching mechanism is normally operable in a locked mode for latching said seat member in one of said lowered exposed and raised storage positions and includes a manually-operable release actuator that is coupled to said latching mechanism for permitting said latching mechanism to be selectively shifted into a released mode for releasing said seat member for movement between said lowered exposed and raised storage positions for causing said movement coordinating means to concurrently move said head support member between said elevated exposed and lowered storage positions, respectively.

17. The child seat of claim 13 wherein said movement coordinating means is a linkage having a first link pivotably coupled between said seat member and a second link, said second link being fixed for movement with said head support member such that movement of said seat member causes said first link to forcibly pivot said second link for causing concurrent and proportional movement of said head support member.

18. The child seat of claim 13 wherein said movement coordinating means comprises a link having a first end pivotably coupled to said seat member and a second end having a toothed segment formed thereon, and a toothed pinion fixed to said head support member and meshingly engaged with said toothed segment, whereby movement of said seat member causes said link to rotate said toothed pinion for concurrently and proportionally moving said head support member.

19. The child seat of claim 13 wherein said movement coordinating means is further operable for moving said back support between a rearward upright position and a forwardly reclined position in response to movement of said seat member between said raised storage position and said lowered exposed position.

20. A retractable child seat for an automotive vehicle comprising:

a passenger seat having a frame and defining a recess for mounting said retractable child seat to said frame;

a back support member pivotally coupled at its upper end to said frame;

a seat member having laterally spaced rearwardly extending leg members, an intermediate portion of said lea member coupled for pivotable movement to a lower portion of said back support member, and a first end portion of said leg member coupled to said frame by means of a follower disposed for sliding movement within a guide slot formed in said frame in response to pivotal movement of said seat member;

a head support member pivotally coupled to said upper end portion of said back support member; and a link member having a lower end pivotally coupled to a portion of said leg member between said intermediate portion and said first end portion, said link member having a second end coupled to said head support member such that as said seat member is pivoted about said intermediate portion said second end of said link member is caused to move, whereby said head support member is caused to pivot between an elevated operative position and a lowered storage position in coordination with pivotable movement of said seat member between a lowered operative position and a raised storage position.

21. The child seat of claim 20 wherein said second end of said link member is pivotally coupled to a pivot link extending from said head support member such that as said upper end of said link member is moved, said pivot link is pivoted for causing said head support member to pivot between said elevated operative position and said lowered storage position.

22. The child seat of claim 20 wherein said upper end of said link member has a rack member that engages a pinion member extending from said head support member such that movements of said upper end of said link member causes said pinion member to rotate for causing said head support member to pivot between said elevated operative position and said lowered storage position.

23. A method of moving an integral child restraint seat between a storage position concealed in the backrest of a vehicle seat and a deployed position, said method comprising the steps of:

actuating a latch mechanism for unlatching a seat member from its raised storage position;

articulating said seat member to a lowered operative position;

automatically rotating a headrest member from a lowered storage position to an elevated operative position in response to lowering of said seat member from said raised storage position to said lowered operative position; and latching said seat member in said lowered operative position.

24. A retractable child seat mountable to a frame structure in a vehicle seat, said retractable child seat comprising:

a seat movable between a raised stored position and a lowered deployed position and having a follower;

a guide member fixed to the frame structure and having a guide slot formed therein for receiving said follower;

a seatback having an upper end pivotally attached to the frame structure and a lower end pivotally attached to said seat;

a head support rotatable between a lowered stored position and an elevated deployed position; and movement coordinating means interconnecting said head support and said seat for coordinating the simultaneous movement thereof, whereby said head support rotates to said elevated deployed position in coordination with movement of said seat to said lowered deployed position, and said head support rotates to said lowered stored position in coordination with movement of said seat to said raised stored position.

25. The retractable child seat of claim 24 wherein movement of said seat to said lowered deployed position causes said follower to slide within said guide slot in a first direction and said first portion of said seatback to pivot relative to the frame structure for moving said seatback to a forward reclined position relative to the vehicle seat, and wherein movement of said seat to said raised stored position causes said follower to slide within said guide slot in a second direction and pivot said first portion of said seatback relative to the frame structure for moving said seatback to a rearward upright position relative to the vehicle seat.

26. The retractable child seat of claim 25 wherein said guide slot is such that movement of said follower in said first direction causes forward movement of said second portion of said seat back relative to the vehicle seat.

27. A retractable child seat mounted to a frame structure of a vehicle seat, said retractable child seat comprising:

a seat movable between a raised stored position and a lowered deployed position and having a follower;

a guide member fixed to the frame structure and having a guide slot formed therein for receiving said follower;

a seatback having an upper end pivotally attached to the frame structure and a lower end pivotally attached to said seat;

a head support interconnected to one of said seat and seatback for rotational movement between a lowered stored position and an elevated deployed position; and movement coordinating means interconnecting said head support to said seat for coordinating the concurrent movement of said head support and said seat, whereby said seatback pivots about said upper end to a forward reclined position and said head support rotates to said elevated deployed position in coordination with movement of said seat to said lowered deployed position, and said seatback pivots about said upper end to a rearward upright position and said head support rotates to said lowered stored position in coordination with movement of said seat member to said raised stored position.

28. The retractable child seat of claim 27 wherein said movement coordinating means is a linkage having a first link pivotally coupled between said seat and a second link, said second link being fixed for movement with said head support such that movement of said seat causes said first link to forcibly pivot said second link for causing concurrent and proportional movement of said head support.

29. The retractable child seat of claim 27 wherein said movement coordinating means is a link having a first end pivotally coupled to said seat and a second end having a toothed segment formed thereon, and a toothed pinion fixed to said head support and meshingly engaging with said toothed segment, whereby movement of said seat causes said linkage to rotate said second toothed pinion link for causing concurrent and proportional movement of said head support.

* * * * *